July 2, 1935.   M. EATON   2,006,631
MEANS FOR REGULATING ELECTRIC STEAM GENERATORS
Filed April 9, 1931   2 Sheets-Sheet 1

MILTON EATON
INVENTOR

ATTORNEY

July 2, 1935.  M. EATON  2,006,631
MEANS FOR REGULATING ELECTRIC STEAM GENERATORS
Filed April 9, 1931   2 Sheets—Sheet 2

MILTON EATON
INVENTOR

ATTORNEY

Patented July 2, 1935

2,006,631

UNITED STATES PATENT OFFICE 2,006,631

MEANS FOR REGULATING ELECTRIC STEAM GENERATORS

Milton Eaton, Shawinigan Falls, Quebec, Canada

Application April 9, 1931, Serial No. 528,857

21 Claims. (Cl. 219—40)

My present invention relates in general to improvements in means for regulating electric steam generators, and has particular reference to the type of control apparatus disclosed in my Patent No. 1,902,842, granted March 28, 1933.

This invention has to do with means for automatically regulating electric steam generators and resides in controlling the conductivity of the water carrying the current, thereby regulating the power input and steam pressure.

To fully explain the advantages of my invention, I shall first refer briefly to the operation of electric steam generators of established design. An electric steam generator, when operating at rated capacity, evaporates every hour about ten times as much water as is normally contained in it; consequently, unless water is bled off, the concentration of salts in solution in the water will increase and cause undesirable increase in the power input. In order to maintain constant water level, the rate at which the feed water is admitted must be increased as the bleed-off is increased and decreased as the bleed-off is decreased. Increasing the rate at which comparatively cool feed water is admitted causes the temperature of the water carrying the current to fall, and consequently its resistance is increased. This gives rise to a further decrease in the power input occasioned by increasing the bleed-off. A corresponding temperature effect occurs when the bleed-off is decreased, which is partly responsible for the change in power input obtained by regulating the amount of bleed-off.

The power taken by an electric steam generator can be rapidly decreased by increasing the bleed-off of water more or less saturated with salts in solution and admitting at a correspondingly increased rate comparatively clean and cool feed water. However, when it is required to suddenly increase the power input very considerably, the response to merely stopping the bleed-off and reducing correspondingly the rate at which the water is admitted is not satisfactory. In this event, it is necessary to temporarily raise the water level on the electrodes. After the increased power input is effected, the water level can be returned to normal where it is held with a decreased rate of bleed-off. Under certain conditions, the increase in power input obtained by raising the water level on the electrodes is not sufficient, for instance, at times when a sudden and considerable increase in conductivity is required.

Cognizant of the foregoing, I contemplate within the purview of my invention the provision of means for admitting a regulated amount of any suitable substance which increases conductivity of the water at the same time as the water is rising on the electrodes, thereby obtaining more immediate and effective response to a sudden demand for increased power input and avoiding the necessity of any great and sudden raising of the water level. One substance which has been found suitable for this purpose is soda ash in aqueous solution but other substances may be used.

The invention is further characterized by the provision of a normally closed bleed-off valve, by virtue of which a very substantial increase in the operating speed of the valve is permissible, resulting in closer regulation and inherent simplification of the regulating instrumentalities.

Supplementing the advantages afforded by utilization of a normally closed bleed-off valve, are those derived from employing a by-pass valve actuated with an appreciable time interval for opening and closing, whereby the objectionable disturbance to the feed water pressure inherent to valves of the instantaneous opening and closing type is avoided.

In contradistinction to that disclosed by the prior art, the cycle of control operation of an electric steam generator operating in accordance with my present invention is characterized in that the water level is normally constant and the bleed-off valve is normally closed. When the power input or steam pressure rises above a predetermined amount, the bleed-off valve slowly opens, reclosing as soon as sufficient bleed-off occurs to restore normal power input or normal pressure. When the power input or steam pressure falls below a predetermined amount, a feed water by-pass valve opens slowly and the water level is carried up on the electrodes and at the same time a proportionate quantity of soda ash solution is admitted, whereby the conductivity is restored. As soon as the power input or steam pressure rises above this predetermined minimum, admission of the soda ash solution is cut off and the water level returns to normal.

Novel aspects, objects and advantages in addition to the foregoing may be ascertained from the following specification, read in conjunction with the annexed drawings, which illustrate one embodiment of the invention, but to the details of which the invention is not confined.

In the drawings:—

Figure 1:
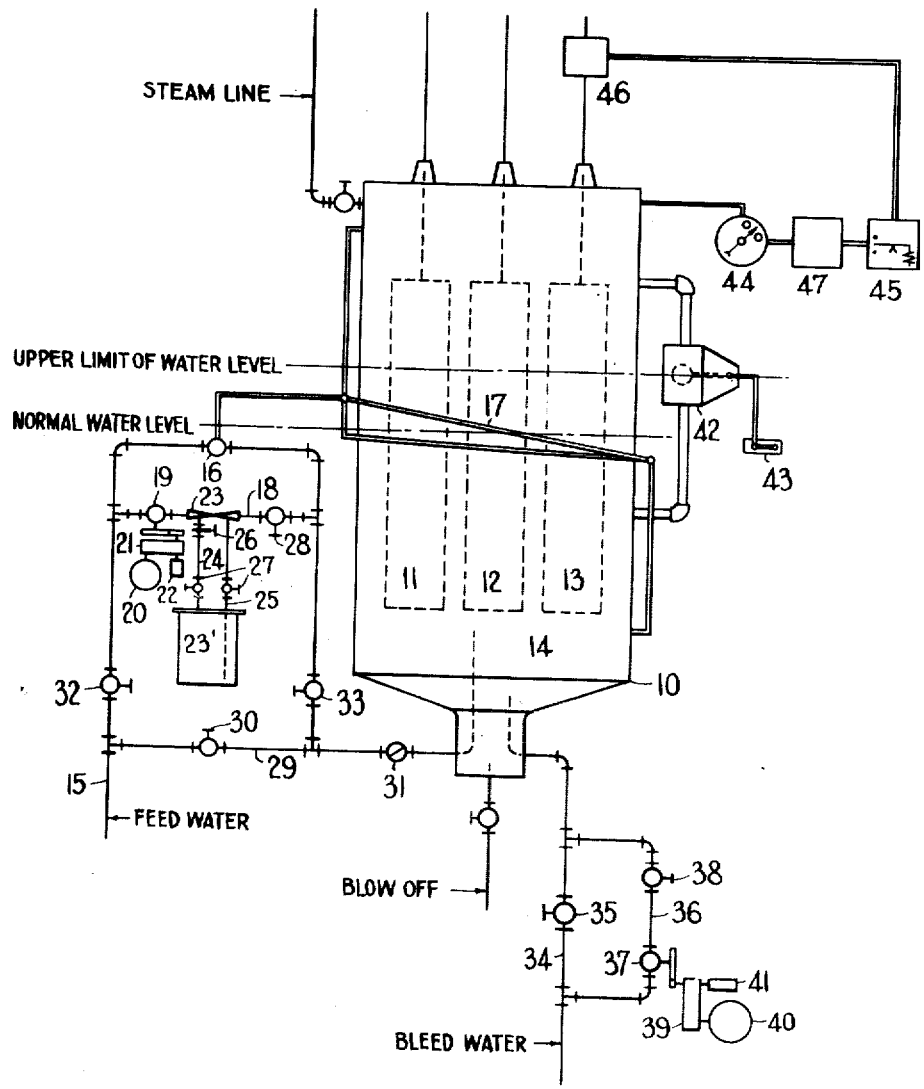
Fig. 1 is a diagrammatical illustration of an electric steam generator provided with the control instrumentalities embodied in the present invention.

Referring to the drawings, the numeral 10 designates an electric steam generator in general, having spaced, insulated electrodes 11, 12 and 13 suspended in the single steam generating boiler 14 and arranged for three-phase alternating current operation, although any suitable number and arrangement of electrodes may be provided.

Water is supplied to the steam generating boiler 14 from a feed water line 15 through a main regulating valve 16 controlled by any suitable type of automatic mechanical regulating device, such as a Copes feed water regulator, indicated generally at 17, and adapted to maintain the water level in the steam generating boiler 14 under ordinary conditions approximately at the normal level indicated. Two by-passes are provided in this feed water line. The first, designated at 18, is provided to by-pass the regulating valve 16, and includes a by-pass valve 19 motor operated with an appreciable time interval for opening and closing, in such wise that the feed water is admitted without disturbance to the feed water pressure. The motor to actuate the valve 19 is indicated at 20, torque being transmitted through a suitable speed reduction unit 21 of any approved type. The reference numeral 22 indicates a geared limit switch connected to the speed reduction unit 21 and adapted to control operation of the motor 20. Feed water is discharged from the by-pass valve 19 through a Venturi nozzle 23, which is in communication with a soda ash solution container 23' by means of pipes 24 and 25. A needle valve 26 is provided on the pipe 24, and both the pipes 24 and 25 are provided with cut-off valves 27. A cut-off valve 28 is provided between the by-pass valve 19 and the steam generating boiler 14. The second by-pass, designated at 29, is located to by-pass both the main regulating valve 16 and the first by-pass 18 and includes a manually operable cut-off valve 30 and an inwardly opening check valve 31. Cut-off valves 32 and 33 are provided in the feed water line between the aforesaid by-passes.

The feed water control described is distinguished from the viewpoint of novelty by utilization of the motor operated by-pass valve 19, which is opened and closed with an appreciable time interval, whereby the feed water is admitted at a considerably increased rate without disturbance to the feed water pressure, and by employment of the Venturi nozzle 23 and associated means for feeding a soda ash solution to restore conductivity of the water.

A bleed water line 34 leads from the bottom of the boiler and includes a manual regulating valve 35 and a by-pass 36 located to by-pass the valve 35 and including a normally closed bleed-off valve 37 and a cut-off valve 38 located between the bleed-off valve 37 and the steam generating boiler 14. The bleed-off valve 37 is operated through a speed reduction unit 39 and a three-phase induction motor 40, providing a ratio of reduction sufficient to enable the feed water regulator, later identified, to adjust itself to changes in the feed water flow. A geared limit switch 41 is connected to the speed reduction unit 39.

Any suitable type of float operated mechanism such as a Locke float chamber, designated at 42, is connected to the steam generating boiler 14 and arranged to operate a cut-out switch 43 if the water in the said boiler should rise to a predetermined maximum level. The limit switch 41 operates to cut out motor 20, as will be hereinafter explained in conjunction with the wiring diagram constituting Fig. 2.

Figure 2:
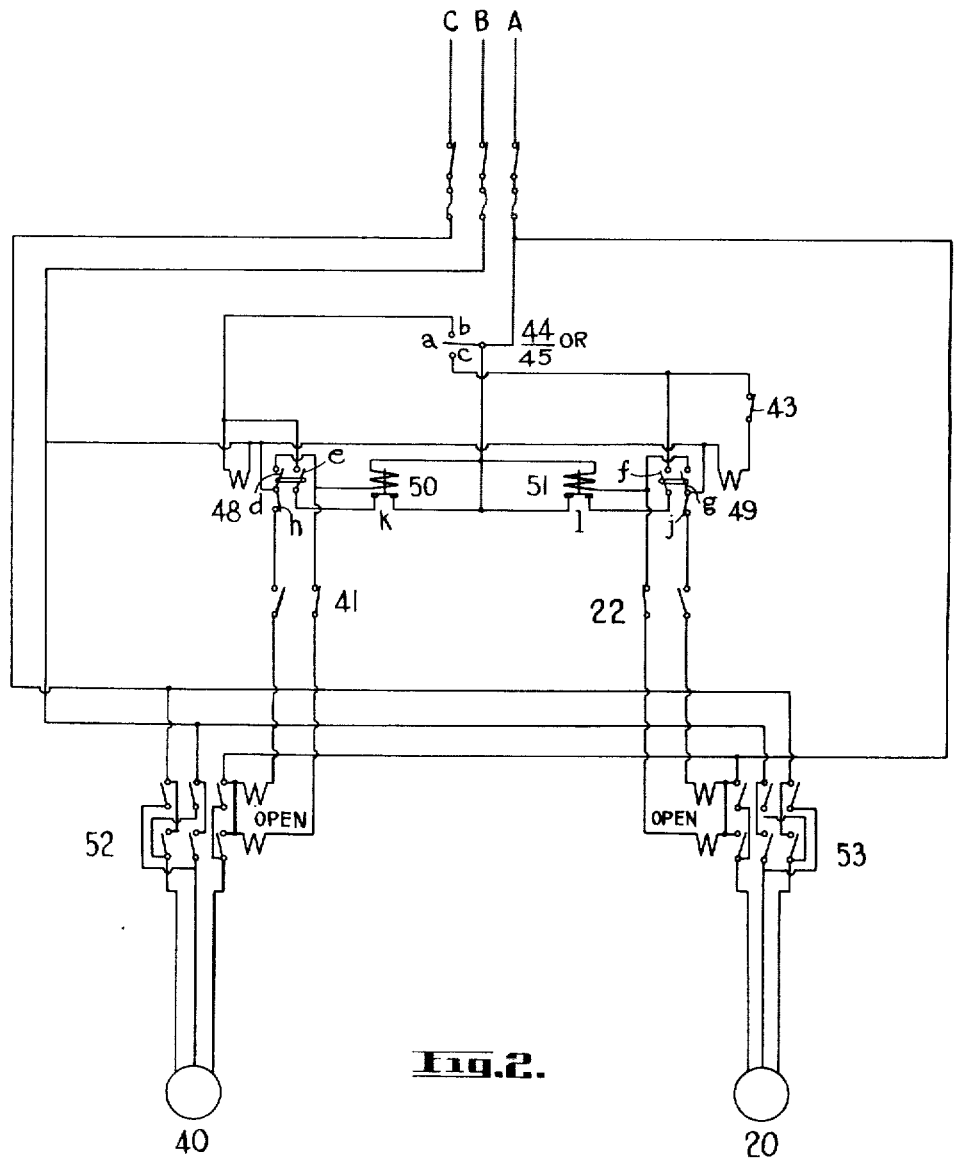
Fig. 2 is a diagram illustrating the control apparatus and the wiring circuit therefor.

Although the novel characteristics of the present invention are embodied in the control means described, to provide a clear understanding of the control circuit, reference is made to the electrical control instruments and the wiring diagram constituting Fig. 2. In Fig. 1, the numeral 44 designates a contact making pressure gauge. A contact making ammeter 45 is connected with a current transformer 46. 47 indicates a double throw switch with which the contacts of the instruments 44 and 45 are connected. By means of this switch, either instrument 44 or 45 may be made the actuating instrument and hence constant pressure control or constant power input control is obtained as desired.

In Fig. 2, the reference characters a, b and c indicate the contacts of either control instrument 44 or 45 depending on which one is in service. The numeral 48 designates a double throw contactor having two normally open pairs of contacts d and e and one normally closed pair of contacts h. The reference numeral 49 indicates a similar double throw contactor having two normally open pairs of contacts f and g and a pair of normally closed contacts j. 50 and 51 indicate definite time relays, the contacts k and l respectively thereof being normally closed. 52 and 53 designate magnetic reversing switches. 22 indicates the geared limit switch which controls the motor 20 and the numeral 41 designates the geared limit switch employed to control the motor 40.

In order to describe the operation, let it be assumed that the control apparatus functions to obtain constant pressure. a, b and c then represent the contacts of the contact making pressure gauge 44. The fixed contact b is set at slightly over normal pressure and the other fixed contact c is set at 7% or 8% below normal pressure. The other control instruments referred to in general are wired in circuit with the fused three-phase control power line A—B—C, from which power flows to the torque motors 20 and 40, according to the wiring diagram constituting Fig. 2.

In operation, should the pressure rise sufficiently for contact a to make contact with contact b, contactor 48 is closed. The closing of contacts d of this contactor energizes one of the directional contactors in the reversing switch 52, causing it to close and the motor 40 to rotate in such a direction that the bleed-off valve 37 is slowly opened. The geared limit switch 41 is adjusted so that the bleed-off valve 37 does not open more than is necessary to cause sufficient bleed-off for the power input and steam pressure to decrease at a satisfactory rate. As soon as the pressure falls sufficiently to carry moving contact a away from the contact b of instrument 44, the contactor 48 becomes de-energized, and contacts d reopen and contacts h close. The closing of contacts h energizes the solenoid of the other directional contactor in the reversing switch 52, causing the motor 40 to rotate in a direction necessary to reclose the bleed-off valve 37. When the bleed-off valve 37 is closed, the limit switch 41 opens to de-energize the switch 52 and stop the motor 40. The bleed-off valve 37 should be so timed in operation that it will not be opened or closed fast enough to appreciably disturb the water level. If it moves slowly, the feed water regulator 17 has sufficient time to adjust itself to meet the required changes in feed water demand.

In the event of a sudden increase in steam demand causing the pressure to fall sufficiently to bring moving contact a of the instrument 44 into contact with contact c, contactor 49 becomes energized and the normally closed pair of contacts j then open and contacts g close. The closing of these contacts energizes the solenoid of one of the directional contactors in reversing switch 53, which closes, causing the motor 20 to rotate in such a direction that the by-pass valve 19 is opened with an appreciable time interval to avoid objectionable disturbance of the feed water pressure. The opening of this valve allows feed water to pass through the Venturi nozzle 23 and the open hand-operated valve 28, thus by-passing the feed water regulator valve 16 and allowing the water level to rise on the electrodes 11, 12 and 13. The valve 28 is adjusted so that the water level rises very slowly.

Water in passing through the Venturi nozzle 23 takes up a limited amount of soda ash solution according to the setting of the needle valve 26, correct adjustment of which may be determined experimentally. As the water level rises on the electrodes and the soda ash solution is fed into the feed water, the power input and steam pressure rise. As soon as the contact a of the instrument 44 is carrier away from the contact c thereof, the contactor 49 and the reversing switch 53 become de-energized. The reclosing of the contacts j of the contactor 49 energizes the directional contactor of the reversing switch 53 which, on closing, causes the motor 20 to rotate in the direction necessary to reclose the by-pass valve 19. The limit switch 22 controls the reversing switch 53 stopping the motor 20 when the by-pass valve 19 reaches its open or closed position. If the contact a of the instrument 44 is still in contact with contact c when the water level has reached its upper limit, the float of the Locke float chamber 42 opens cut-out switch 43, thus de-energizing the solenoid of the contactor 49, causing the by-pass valve 19 to reclose as previously described. The float controlled cut-out switch 43 and the motor operated by-pass valve 19 then become substantially a feed water regulator which holds the water level at its upper limit until pressure rises sufficiently to break contact between contacts a and c of the instrument 44. When this occurs, the by-pass valve 19 recloses and no more water is admitted until the water level returns to normal, where it is again held by the feed water regulator 17.

On account of changes in pressure being slow and somewhat pulsating, objectionable arcing would occur between the contacts of the regulating instrument 44, unless means were provided to avoid it. Such arcing would be accompanied by chattering of the control contactors and probable freezing of the contacts.

When the moving contact a of the instrument 44 comes into contact with contact b, the contactor 48 closes. The normally open pair of contacts e of this contactor on closing complete a holding circuit with the normally closed contacts k of the time relay 50. This circuit bridges the contacts a and b of the instrument 44, thus avoiding any tendency to arcing. The closing of the contacts d of the contactor 48 energizes the time relay 50, which is connected in parallel with the solenoid of the associated directional contactor in the reversing switch 52. After the time setting of the relay 50 is elapsed, the contacts k open, allowing the contactor 48 to reopen if contact is broken between contacts a and b of the instrument 44. The time setting of the time relay 50 should be such that, under steady load conditions, contacts k open just after contact is broken between the contacts a and b aforesaid. The time relay must be of a type which resets instantaneously when de-energized in order that, when the contactor 48 opens, it immediately resets and functions again in the event of any further tendency to arcing. Arcing between the contacts a and c of the instrument 44 is similarly avoided by means of the time relay 51 and the contacts f of the contactor 49.

The operation for constant power input control is exactly as previously described, except that in this case the contact making ammeter 45 is used as the actuating instrument.

In order to apply this system of control to a three-phase electric steam generator having a separate tank for each electrode or to any number of units operating in parallel, a separate control as described above is required for each unit. If constant adjustable pressure control is desired, one contact making pressure gauge is used together with current balance relays employed to supervise the operation of the bleed-off valves in such wise that the correct ratio of power taken by each unit is maintained.

Having thus described my invention, what I claim is:—

1. In means for regulating electric steam generators to maintain a selected condition of operation substantially constant, the combination with a steam generating boiler and water level controlled boiler feed water regulating means adapted to maintain a normally constant immersion of the boiler electrodes, of bleed-off means for said boiler coordinated in timed relation with said feed water regulating means whereby said feed water regulating means is enabled to adjust itself to changes in feed water flow thereby to maintain the water level substantially constant.

2. In means for regulating electric steam generators to maintain a selected condition of operation substantially constant, the combination with a steam generating boiler and boiler feed water regulating means, of a bleed-off valve for said boiler; and controlling means for said bleed-off valve including a speed reduction unit providing a ratio of speed reduction for the actuation of said bleed-off valve sufficient to enable the said feed water regulating means to adjust itself to changes in feed water flow.

3. In means for regulating electric steam generators to maintain a selected condition of operation substantially constant, the combination with a steam generating boiler and water level controlled boiler feed water regulating means adapted to maintain a normally constant immersion of the boiler electrodes, of a bleed-off valve for said boiler; and means to control actuation of said bleed-off valve in such wise that the water level on the boiler electrodes is not appreciably disturbed.

4. In means for regulating electric steam generators to maintain a selected condition of operation substantially constant, the combination with a steam generating boiler; of a normally closed bleed-off valve for said boiler, the opening of which tends to lower the water level on the boiler electrodes and means to control operation of said bleed-off valve.

5. In means for regulating electric steam generators to maintain a selected condition of operation substantially constant, the combination with a steam generating boiler; of a normally closed bleed-off valve for said boiler and means to control operation of said bleed-off valve whereby upon predetermined increase in boiler pressure said bleed-off valve is slowly opened, and upon predetermined decrease in the boiler pressure, said bleed-off valve is slowly closed.

6. In means for regulating electric steam generators to maintain a selected condition of operation substantially constant, the combination with a steam generating boiler, of a governing instrument responsive to variations in the selected condition; a bleed-off valve for said boiler; and means to control said bleed-off valve through said governing instrument whereby, upon predetermined increase in boiler pressure, said bleed-off valve is slowly opened, and upon predeterminded decrease of the boiler pressure, said bleed-off valve is slowly closed.

7. In means for regulating electric steam generators to maintain a selected condition of operation substantially constant, the combination with a steam generating boiler, of a governing instrument responsive to variations in the selected condition; a feed water by-pass valve for said boiler; and means to control actuation of said feed water by-pass valve through said governing instrument whereby, in response to variation in boiler pressure, said feed water by-pass valve is opened with an appreciable time interval in such wise that objectionable disturbance of the feed water pressure is avoided.

8. In means for regulating electric steam generators to maintain a selected condition of operation substantially constant, the combination with a steam generating boiler, of a governing instrument responsive to variations in the selected condition; a feed water by-pass valve connected to said boiler; a speed reduction unit mechanically connected to said by-pass valve; an electric motor to actuate said by-pass valve through said speed reduction unit; and control means operated through said governing instrument whereby said by-pass valve is slowly opened upon predetermined increase in boiler pressure.

9. In means for regulating electric steam generators to maintain a selected condition of operation substantially constant, the combination with a steam generating boiler and water level controlled means to normally maintain a constant immersion of the boiler electrodes, of a governing instrument responsive to variations in the selected condition; means independent of said water level controlled means, controlled through said governing instrument tending to increase the immersion of the electrodes; and automatic means to increase the conductivity of the water upon operation of said means tending to increase electrode immersion to obtain a more immediate and effective response to a sudden demand for increase in the controlled condition.

10. In means for regulating electric steam generators to maintain a selected condition of operation substantially constant, the combination with a steam generating boiler and water level controlled means to normally maintain a constant immersion of the boiler electrodes, of a governing instrument responsive to variations in the selected condition; means, independent of said water level controlled means, controlled through said governing instrument including a by-pass valve to admit water to the boiler with tendency to increase water level on the electrodes; and means coordinated in timed relation with said by-pass valve, to increase the conductivity of the water under conditions in which the mere raising of the boiler water level will not effect sufficient and substantially immediate response to a sudden demand for increase in the controlled condition.

11. In means for regulating electric steam generators to maintain a selected condition of operation substantially constant, the combination with a steam generating boiler and water level controlled means to normally maintain a constant immersion of the boiler electrodes, of a governing instrument responsive to variations in the selected condition; means controlled through said governing instrument, including a feed water valve by-passing said water level controlled means to admit water to the boiler independently of said water level controlled means; and means to increase the conductivity of the feed water ingressing through said by-pass valve by charging the ingressing water with a chemical solution capable of increasing the conductivity of the water, thereby to minimize the variation of the water level necessary to realize desired increase in the controlled condition.

12. In means for regulating electric steam generators to maintain a selected condition of operation substantially constant, the combination with a steam generating boiler of means, including a by-pass valve, to feed into the boiler a chemical solution capable of increasing the conductivity of the boiler water; a governing instrument responsive to variations in the selected condition and means controlled by said governing instrument to open said by-pass valve upon predetermined change in the selected condition, thereby to obtain a substantial and immediate increase in power input at any given level of water in the boiler.

13. In means for regulating electric steam generators to maintain a selected condition of operation substantially constant, the combination with a steam generating boiler, of a governing instrument responsive to variations in the selected condition; means controlled through said governing instrument to govern boiler water level, including a feed water by-pass valve; a source of chemical solution supply; a Venturi nozzle connected with said source of chemical solution supply through which water flows from said by-pass valve, whereby the chemical solution is discharged into said boiler in the feed water to increase the conductivity thereof.

14. In means for regulating electric steam generators to maintain a selected condition of operation substantially constant, the combination with a steam generating boiler; of a normally closed bleed-off valve for said boiler and means to control operation of said bleed-off valve whereby upon predetermined increase in power input said bleed-off valve is slowly opened, and upon predetermined decrease in the power input, said bleed-off valve is slowly closed.

15. In means for regulating electric steam generators to maintain a selected condition of operation substantially constant, the combination with a steam generating boiler, of a governing instrument responsive to variations in the selected condition; a bleed-off valve for said boiler; and means to control said bleed-off valve through said governing instrument whereby, upon predetermined increase in power input, said bleed-off valve is slowly opened, and upon predetermined decrease of the power input, said bleed-off valve is slowly closed.

16. In means for regulating electric steam generators to maintain a selected condition of operation substantially constant, the combination with a steam generating boiler, of a governing instrument responsive to variations in the selected condition; a feed water by-pass valve for said boiler; and means to control actuation of said feed water by-pass valve through said governing instrument whereby, in response to variation in power input, said feed water by-pass valve is opened with an appreciable time interval in such wise that objectionable disturbance of the feed water pressure is avoided.

17. In means for regulating electric steam generators to maintain a selected condition of operation substantially constant, the combination with a steam generating boiler, of a governing instrument responsive to variations in the selected condition; a feed water by-pass valve connected to said boiler; a speed reduction unit mechanically connected to said by-pass valve; an electric motor to actuate said by-pass valve through said speed reduction unit; and control means operated through said governing instrument whereby said by-pass valve is slowly opened upon predetemined increase in power input.

18. In an electric steam generator, the combination with a boiler, means to feed water into and maintain water normally at constant level on the electrodes of said boiler, and means responsive to variation in a controlled condition of the generator to bleed water from the boiler at such rate with reference to the capacity of the feed means that the level of water on the boiler electrodes will be substantially unaltered.

19. In an electric steam generator having water supply means adapted to normally maintain a constant water level on the generator electrodes, means responsive to variation in a controlled condition of the generator to decrease power input to the generator through discharge of water therefrom at such rate with reference to the capacity of the supply means as will maintain the water level on the generator electrodes substantially unaltered.

20. In an electric steam generator, means to feed water into and maintain water normally at constant level on the electrodes of the generator and auxiliary means to feed water into said generator thereby to raise the water level on the electrodes, and means to obtain an increase of power input disproportionate to the increase in water level comprising means actuated concurrently with said auxiliary feeding means to increase the conductivity of the auxiliary feed water.

21. In an electric steam generator, means to feed water into and maintain water normally at constant level on the electrodes of the generator and auxiliary means to feed water into said generator thereby to increase the power input through raising the water level on the electrodes, and means to offset the relatively low conductivity and relatively low temperature of the auxiliary feed water adapted to inject into the generator concurrently with said auxiliary water feed a chemical capable of increasing the conductivity of the water, thereby to obtain the desired increase of power input with a minimum increase of water level.

MILTON EATON.